(12) United States Patent
Park

(10) Patent No.: US 7,919,541 B2
(45) Date of Patent: Apr. 5, 2011

(54) METHOD OF MANUFACTURING FLAME-RETARDANT POLYMER FOAM COMPRISING A PHOSPHOROUS FLAME RETARDANT AND FLAME-RETARDANT FOAM PRODUCED THEREBY

(75) Inventor: Chung Poo Park, Waltham, MA (US)

(73) Assignee: Chung P. Park, Canton, MA (US)

( * ) Notice: Subject to any disclaimer, the term of this patent is extended or adjusted under 35 U.S.C. 154(b) by 444 days.

(21) Appl. No.: 11/799,621

(22) Filed: May 2, 2007

(65) Prior Publication Data

US 2007/0259980 A1   Nov. 8, 2007

(30) Foreign Application Priority Data

May 2, 2006   (KR) .................. 10-2006-0039476

(51) Int. Cl.
*C08G 18/16* (2006.01)
*C08J 9/00* (2006.01)
*C08J 9/36* (2006.01)
*C08J 9/32* (2006.01)
*C08K 5/53* (2006.01)

(52) U.S. Cl. ............... 521/108; 521/53; 521/55; 521/73; 521/79; 521/85; 521/107; 521/106; 524/133; 524/135

(58) Field of Classification Search ............. 521/85, 521/79, 107, 108, 53, 55, 73, 106; 524/133, 524/135
See application file for complete search history.

(56) References Cited

U.S. PATENT DOCUMENTS

| | | | |
|---|---|---|---|
| 4,769,182 A | 9/1988 | Hazen | |
| 5,348,795 A | 9/1994 | Park | |
| 5,527,573 A | 6/1996 | Park et al. | |
| 5,567,742 A | 10/1996 | Park | |
| 6,090,976 A | 7/2000 | Kim et al. | |
| 6,399,814 B1 | 6/2002 | Weinkauff et al. | |
| 7,655,715 B2* | 2/2010 | Bauer et al. | 524/133 |
| 2004/0039072 A1* | 2/2004 | Park | 521/50 |
| 2004/0198877 A1* | 10/2004 | Yang et al. | 524/115 |
| 2006/0222774 A1* | 10/2006 | Flanders | 427/393.3 |
| 2007/0112082 A1* | 5/2007 | Hahn et al. | 521/60 |

* cited by examiner

Primary Examiner — Vasu Jagannathan
Assistant Examiner — Irina Krylova

(57) ABSTRACT

The present invention concerns a method of manufacturing flame-retardant polyethylene or polypropylene foam using a derivative of carboxylic acid of phenylphosphinic acid and the flame-retardant polymer foam made thereby. More specifically, this invention concerns a method of manufacturing highly expanded flame-retardant polymer foam prepared by mixing the above mentioned phosphorous flame retardant in a polymer resin and expanding the mixture with a volatile blowing agent or by applying a solution of an organic phosphorous compound to an already-made highly expanded foam and then drying the highly-expanded polymer foam, and the flame-retardant foam prepared thereby.

21 Claims, No Drawings

METHOD OF MANUFACTURING FLAME-RETARDANT POLYMER FOAM COMPRISING A PHOSPHOROUS FLAME RETARDANT AND FLAME-RETARDANT FOAM PRODUCED THEREBY

CROSS-REFERENCES TO RELATED APPLICATIONS

This application is a U.S. filing of the Korean Application No. 10-2006-0039476, filed on May 2, 2006 (Priority Document)

STATEMENT REGARDING FEDERALLY SPONSORED RESEARCH OR DEVELOPMENT

Not applicable

BRIEF DESCRIPTION OF THE SEVERAL VIEWS OF THE DRAWING

Not applicable

BACKGROUND OF THE INVENTION

The present invention concerns a method of preparing flame-retardant polymer foam using phosphorous flame retardant and flame-retardant polymer foam prepared thereby. More specifically, this invention concerns a method of preparing a flame-retardant foam having an excellent flame retardant effect either by melt-blending a specific phosphorous flame retardant in a polymer resin and then foaming or by preparing a foam first and then applying a solution of an organic phosphorous compound to the foam, and a flame-retardant foam prepared thereby.

Generally, polymer foams are used in durable applications such as in construction and automotive uses, where the foams require flame retardance and durability.

The majority of traditional flame-retardant foams are manufactured by melt-blending a halogen flame retardant compound in a resin and expanding the blend. In general, halogen flame retardants not only lack thermal stability thereby causing processing problems by decomposing in the extruder but also are subject to regulations since the compounds generate dioxins during combustion thereby presenting an environmental problem.

Therefore, in order to substitute halogen flame retardants having such problems, there have been active research efforts to use an inorganic compound or a phosphorous compound. However, in the case of extruding highly expanded polyolefin foam, economic problems arise due to the inefficiency of traditional phosphorous flame retardants and also to the processing problems in the foam manufacture.

Since phosphorous flame retardants are less effective than halogen compounds, a larger amount must be incorporated than a halogen compound in order to achieve the same effect. In order to incorporate a large amount, phosphorous flame retardants are generally made to have a good compatibility with the resin. However, incorporation of a large amount of flame retardant causes an over-plasticizing problem of the resin or harming the foamability of the resin. Consequently, there is a need for developing a flame retardant which is stable at an elevated temperature in the extruder as well as being effective as a flame retardant at a low level.

Another method of achieving flame retardance is to impregnate a flame retardant into already manufactured foam. In this method, a flame retardant is dissolved in a solvent like water, let the solution penetrate into a foam and the solvent is dried out. A successful practice of this method requires an easy penetration of water into the foam. However, most common polymer resins are hydrophobic and the foams prepared by extrusion are generally of closed cell structure, and even if the foam is made to have open-cell structure, the pores are too small to absorb water. Consequently, there is needed a means for enhancing the solution absorption capability of a foam. In addition, there are needed an effective flame retardant and its application method that can provide sufficient flame retardance with a small amount of impregnation since, even if the foam is made to absorb the solution successfully, the foam must be dried after the treatment.

In addition, the process of manufacturing a polyolefin foam presents a fire hazard since most highly expanded polyolefin foams are currently prepared by a flammable low hydrocarbon blowing agent and the hydrocarbon is released during foam expansion and aging. Specially, a large amount of hydrocarbon is released from the foam before the foam is sufficiently cooled thereby causing a fire hazard. In order to reduce the fire hazard, the released hydrocarbon is diluted to a low concentration with a large amount of air and the static electricity is eliminated near the foam surfaces where lowering of the hydrocarbon concentration is difficult.

BRIEF SUMMARY OF THE INVENTION

The purpose of the present invention is to solve the forementioned processing problems in preparation of a highly expanded flame-retardant polymer foam with the use of a specific phosphorous flame retardant and to provide a method of manufacturing a flame-retardant polymer foam that is highly flame-retardant as well as being environmentally friendly, and the flame retardant foam prepared thereby, either by foaming a polymer resin where the flame retardant is melt-blended therein or by impregnating a solution of the flame retardant into a foam which has been perforated to absorb the flame retardant solution well.

An advantage of the method of preparing a flame retardant polymer foam in accordance with this invention is to form holes by perforation through the foam surfaces thereby facilitating absorption of phosphorous flame retardant in the foam interior thereby enhancing the flame retardance of the foam.

Another advantage of the method of preparing a flame retardant polymer foam in accordance with this invention is to provide environmentally friendly flame retardant polymer foam which has outstanding flame retardance by the use of a phosphorous flame retardant which is not harmful and emits no toxic gases during combustion.

Yet another advantage of preparing a flame retardant polymer foam in accordance with this invention is its ready applicability at a low cost to various foams since an already-made foam can be made flame-retarded by spraying or coating of a solution of a phosphorous flame retardant on the foam.

DETAILED DESCRIPTION OF THE INVENTION

In order to achieve the above-mentioned objectives, the flame-retardant foam in accordance with this invention is manufactured either by a one-step direct extrusion foaming process or a multi-step process. In a direct extrusion foaming process, the specific phosphorous flame retardant is melt-blended with a polymer resin and a volatile blowing agent in a conventional foam extruder and the blend is expanded into a foam. In the multi-step process, a phosphorous flame retardant is impregnated into an already made polymer foam, and the process is characterized to include the steps of preparing a highly expanded polymer foam from a polymer resin using a volatile blowing agent; perforating thus-prepared highly expanded polymer foam; treating for flame retardance the highly expanded foam with a solution of a phosphorous flame retardant; and drying the foam treated with flame retardant solution.

In addition, in the step of preparing a highly expanded polymer foam above, there may be added a flame retardant, stability control agent, surfactant, antioxidant, cell-nucleating agent and radiation blocker, etc.

In addition, the step of treating the highly expanded polymer foam for flame retardance is either to let the highly expanded polymer foam absorb solution of the fore-mentioned flame retardant by submerging the highly expanded polymer foam in the solution or to spray a phosphorous flame retardant solution onto the surfaces of a highly expanded polymer foam.

The phosphorous flame retardant used in this invention is at least one compound selected from the derivatives of carboxylic acid of phenylphosphonic acid as depicted by chemical formula 1 below. Among them, 3-(hydroxyphenylphosphinyl) propanoic acid is the most preferred.

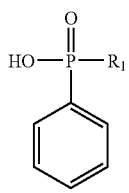

Chemical Formula 1 where $R_1$ is —$CH_2COOH$, $CH_2CH_2COOH$ or —COOH.

The method of preparing a flame-retardant polymer foam according this invention is described to a greater detail below.

The Step of Manufacturing a Highly Expanded Polymer Foam

The highly expanded polymer foam according to this invention is manufactured by the extrusion process from a polyolefin resin using a volatile blowing agent.

The polyolefin resin used in the above step is a single resin or a blend of two or more resins selected from the group comprising polypropylene homopolymers, polypropylene copolymers, polyethylene homopolymers and polyethylene copolymers. In addition, other polymers may be blended therein in an amount that does not harm the foamability. The polyethylene homopolymers and copolymers for use in this invention include both the linear and branched resins. Among these polymer resins and resin blends, those containing 50% or more of propylene moiety are the most desirable.

The volatile blowing agent for use in this invention is selected from the group comprising hydrocarbons that include ethane, propane, normal butane, isobutene and pentanes, etc., alcohols, carbon dioxide and water and a mixture thereof. Among the compounds, propane and isobutene are the most desirable.

A highly expanded polymer foam prepared as such has an expansion ratio from 4.5 to 225 and density from 4 kg/m$^3$ to 200 kg/m$^3$, preferably an expansion ratio from 20 to 150 and density from 6 kg/m$^3$ to 90 kg/m$^3$, most preferably an expansion ratio from 30 to 100 and density from 9 kg/m$^3$ to 30 kg/m$^3$. In addition, the polymer foam preferably contains 5% or more open cells and absorbs 5% or more water when put in the water.

The foam prepared in accordance with this invention can be produced using a sheet or block die to the desired shape, most preferably using a multi-hole die to a block of coalesced strands disclosed in U.S. Pat. No. 5,348,795.

If needed, in manufacture of the fore-mentioned highly expanded polymer foam, there may be added a cell-nucleating agent, stability control agent, antioxidant, ultraviolet light stabilizer, pigment, radiation blocker, flame retardant, etc. In addition, there may be added a surfactant in order to facilitate penetration of water. Specially, the fore-mentioned surfactant is desirably selected from the group consisting of non-ionic surfactants, cationic surfactants and anionic surfactants. The radiation blocker reduces heat transmission by radiation by absorbing or dissipating the infra-red ray. Carbon black or graphite powder may be used as a radiation blocker.

The Step of Perforating the Highly Expanded Polymer Foam (Perforation Step)

The next step is to drill holes into the highly expanded polymer foam so that the foam can absorb water.

In order to open the passage through which water can penetrate effectively, it is desirable to prepare a foam having large pores to start with. Since the skin of the foam prevents water from ready penetration, the foam is perforated with a tool having a sharp tip like an awl to let water readily penetrate into the foam interior.

In order to open the passage through which water can penetrate effectively, it is desirable to prepare a foam having large pores to start with. Since the skin of the foam prevents water from ready penetration, the foam is perforated with a tool having a sharp tip like an awl to let water readily penetrate into the foam interior.

As for the perforation, the foam may be perforated through or partially perforated and the perforation density is preferably from 2 per 10 cm$^2$ to 50 per 10 cm$^2$, more preferably from 3 per 10 cm$^2$ to 30 per 10 cm$^2$, most preferably from 4 per 10 cm$^2$ to 20 per 10 cm$^2$.

In addition, perforation helps in release of a flammable blowing agent from the foam.

Treatment for Flame Retardance

A solution of phosphorous flame retardant is prepared and impregnated into a foam that has been perforated as above.

The phosphorous flame retardant solution is a solution of a derivative of carboxylic acid of phenylphosphonic acid as depicted by chemical formula 1 below, where the carboxylic acid is formic acid, acetic acid and propanoic acid, etc. The use of 3-(hydroxyphenylphosphinyl) propanoic acid is the most desirable.

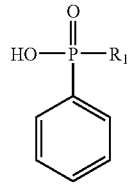

Chemical Formula 1 where $R_1$ is —$CH_2COOH$, $CH_2CH_2COOH$ or —COOH.

The methods of impregnating the flame retardant solution into polymer foam include spraying a phosphorous flame retardant solution onto a polymer foam using a spray nozzle or submerging the polymer foam in a phosphorus flame retardant solution.

In order to facilitate penetration of the solution into a polymer foam, the foam may be submerged in the solution as squeezed and then unsqueezed. Squeezing offers another benefit of promoting the release of a flammable blowing agent.

Applying a flame retardant solution to a polymer foam may reduce the fire hazard by eliminating the static electricity.

Drying Step

The polymer foam which has absorbed flame retardant solution in the above step is dried. While a foam on which the flame retardant solution is sprayed may dry easily, a polymer foam that has been submerged in a solution will be difficult to dry out by natural drying. The absorbed water may be squeezed using a two-roll press prior to drying.

Drying may be done in a heated warehouse where the foam is aged for quick release of flammable blowing agent.

In addition to the fore-mentioned method, a flame-retardant foam may be prepared by direct extrusion either by melt blending the fore-mentioned phosphorous flame retardant fed directly into the extruder with a polymer resin or by injecting a solution of the compound into the extruder.

The content of the fore-mentioned phosphorous flame retardant in a flame-retardant polymer roam according to this invention is, on a dry basis, in the range from 0.1 parts per hundred parts of the polymer resin to 50 parts per hundred parts of the polymer resin.

Examples and comparative examples of invention are described to the greater detail in the following.

EXAMPLES

Example 1-1

Highly Expanded Open-Cell Polypropylene Foam that is Perforated and Treated for Flame Retardance with a 0.5% Solution of 3-(hydroxyphenylphosphinyl) Propanoic Acid The apparatus used in this example is a tandem foam extrusion line comprising a 64 mm diameter single-screw primary extruder and a 90 mm diameter single-screw cooling extruder. The primary extruder has sequential zones for feeding, melting, metering and mixing. An opening for blowing agent injection is located in the barrel of the mixing zones. At the downstream of the cooling zone, there is attached a strand die block where 160 circular apertures of 1 mm diameter are drilled in an array of 8 rows with 20 apertures per row. The even rows are slightly displaced to the right so that the apertures of adjacent two rows form an equilateral triangular pattern with the distance between apertures of 4.5 mm. At exit of the die orifice, there are furnished the shaping rolls, a conveyor belt and the pull rolls in sequence.

When the foam extrusion is started, the temperatures of the primary extruder zones are set as follows: the feeding zone at 160° C., the melting zone at 190° C., the metering and mixing zones at 200° C., and the zones of the cooling extruder are set at 200° C.

First, a polypropylene homopolymer resin having a melt flow rate (MFR) of 0.5 g/10 min per ASTM D-1238 at 2.16 kg/230° C. is blended with 0.1 parts by weight per hundred parts by weight of the resin (pph) of antioxidant and fed into the extruder. The screw rotating speed of the extruder is adjusted so as to achieve an extrusion rate of 80 kg per hour (kg/h). Isobutane is injected into the mixing zone at a uniform rate of 13.6 kg/h (equivalent to 17 pph).

When a steady extrusion condition is reached, the cooling zone temperature is gradually reduced until optimum foam is obtained. In the case of this example, the optimum foam was obtained when the cooling zone temperature reached 159° C.

The highly expanded open-cell polypropylene foam prepared in Example 1-1 has a block shape formed by coalesced foam strands of approximately 5.5 mm in diameter. The height of the block is approximately 44 mm and the width of the block is approximately 110 mm. The foam is open-celled with most of the interior cells of the strands broken and has a density of 16.8 kg/m$^3$ and the cell size of 0.6 mm.

Determination of Open-Cell Content and Water Absorption Capability

The open-cell content and water absorption capability of the highly expanded open-cell polypropylene foam prepared in Example 1-1 were measured. The open-cell content was measured per a method described in ASTM D-2845 Procedure A. The water absorption capability was measured as follows.

A cubic foam specimen having a side of approximately 15 mm was prepared, squeezed as submerged in water so that most of the air in the specimen can be pushed out, and let absorb the water.

In order to accelerate water absorption and recovery of the foam specimen, the specimen was first submerged in warm water at 80° C. for one hour and then in ambient water for one hour to cool. Then, the specimen was taken out of the water, the surface water was wiped out and the weight and dimensions were measured again. The volume of water absorbed in the foam specimen was calculated form the weight of absorbed water. From the volume of water and the foam volume that was calculated from the dimensions of the final foam specimen, the volume of absorbed water was calculated. The highly expanded open-cell polypropylene foam in this Example 1-1 was calculated to have absorbed 66% by volume of water and 81% open cells.

Preparation of Specimens

The specimens were prepared from the above-manufactured highly expanded open-cell polypropylene foam and used for flame retardance tests as follows:

First, the extruded polypropylene foam was perforated in the direction perpendicular to the extrusion direction in order to facilitate absorption of the solution. Perforation was done through the foam body using a needle made of a 2 mm-diameter steel rod sharpened at the tip in an equilateral triangular pattern so that the hole-to-hole distance can become 10 mm.

The perforated foam was cut to hexahedral specimens having a thickness of approximately 20 mm, a width of approximately 35 mm and a length of 85 mm so that the perforation can be in the thickness direction and the length direction can be the extrusion direction.

Treatment for Flame Retardance

The specimens of highly expanded open-cell polypropylene foam were treated for flame retardance using 3-(hydroxyphenylphosphinyl) propanoic acid (HPPA) and subjected to flame retardance tests.

First, 3-(hydroxyphenylphosphinyl) propanoic acid of a predetermined quantity is dissolved in 60° C. warm water to prepare a 0.5% flame retardant solution. Foam specimens are let absorb sufficient amount of flame retardant solution by submerging, squeezing and releasing the pressure in the flame retardant solution. Then, the flame retardant solution is squeezed out of the foam specimens, which were dried at ambient temperature for two days and further in a 40° C. oven for five hours. The amount of the solid flame retardant in a foam specimen was calculated from the weight of the foam specimen before and after the treatment.

The foam specimens as prepared above were subjected to a flame retardance test as follows. First, a foam specimen is fixed horizontally so that the length direction can be horizontal and the width direction can be vertical. The foam specimen was ignited at the end using a propane gas flame of 5 cm in height for five seconds and the flame source was removed and then the flame spread was observed. If the flame is self-extinguished, the specimen was reignited. The test was repeated with the same specimen if an enough material was left.

Example 1-2

Highly Expanded Open-Cell Polypropylene Foam that is Perforated and Treated for Flame Retardance with a 1% Solution of 3-(hydroxyphenylphosphinyl) Propanoic Acid In this example, the highly expanded open-cell specimens with perforation were prepared at the same condition as in Example 1-1 and treated with 1% solution of solution of 3-(hydroxyphenylphosphinyl) propanoic acid and tested for flame retardance by the same method as in Example 1-1.

Example 1-3

Highly Expanded Open-Cell Polypropylene Foam that is Perforated and Treated for Flame Retardance with a 3% Solution of 3-(hydroxyphenylphosphinyl) Propanoic Acid In this example, the highly expanded open-cell specimens with perforation were prepared at the same condition as in Example 1-1 and treated with 3% solution of solution of 3-(hydroxyphenylphosphinyl) propanoic acid and tested for flame retardance by the same method as in Example 1-1.

Example 1-4

Highly Expanded Open-Cell Polypropylene Foam that is not Perforated but Treated for Flame Retardance with a 3% Solution of 3-(hydroxyphenylphosphinyl) Propanoic Acid In this example, a highly expanded open-cell foam is prepared at the same condition as in Example 1-1, not perforated and cut to specimens of the same size as in Example 1-1 and treated with 1% solution of solution of 3-(hydroxyphenylphosphinyl) propanoic acid and tested for flame retardance by the same method as in Example 1-1.

Comparative Example 1-1

Highly Expanded Open-Cell Polypropylene Foam that is Perforated but not Treated with Flame Retardant In this comparative example, highly expanded open-cell foam specimens with perforation were prepared at the same condition as in Example 1-1 and subjected to a flame retardance test without flame retardant treatment.

The results of flammability tests for Example 1-1, 1-2, 1-3 1-4 and Comparative Example 1-1 are set forth in Table 1.

TABLE 1

| Test No. | Perforation Method | Concentration of Flame Retardant in Solution (%) | Content of Solid Flame Retardant (pph) | No. of Flame Retardance Tests | No. of Self-Extinguished Tests | Average Burning Time (sec) | Average Burning Rate (mm/s) |
|---|---|---|---|---|---|---|---|
| Ex. 1-1 | Perforated Through | 0.5 | 0.5 | 3 | 3 | 3.5 | 0.11 |
| Ex. 1-2 | Perforated Through | 1 | 2.4 | 3 | 3 | 2.0 | 0.17 |
| Ex. 1-3 | Perforated Through | 3 | 12.5 | 3 | 3 | 2.8 | 0.16 |
| Ex. 1-4 | Not Perforated | 3 | 10.7 | 2 | 2 | 11.1 | 0.11 |
| Comp. Ex. 1-1 | Perforated Through | Not treated | 0.0 | 1 | 0 | 14.7 | 2.61 |

In the above table, the content of solid flame retardant is parts of the solid flame retardant contained in the specimen per one hundred parts (pph) of the resin determined with a dried specimen; the number of self-extinguished tests is the number of tests where the flame extinguished by itself during the tests; and the average burning time is the average of the net burning times, which are the total burning time less the five second ignition time.

As shown in Table 1, the solid flame retardant content increases when treated with a solution having an increased flame retardant concentration.

In addition, while the specimens in Comparative Example 1-1 burn out at a high burning rate, the flame retardant-treated specimens in Examples 1-1, 1-2, 1-3 and 1-4 are shown to self-extinguish during the three flammability tests, the average burning times are shorter than for Comparative Example 1-1, and the burning rates are noticeably shorter than for Comparative Example 1-1. In the case of Example 1-1, an extremely low flame retardant content of 0.5 pph still has an outstanding flame retardant effect.

In addition, the specimens that were treated with flame retardant without perforation in Example 1-4 are shown to burn longer than the specimens in Examples 1-1 and 1-3.

Example 2-1

Highly Expanded Closed-Cell Polypropylene Foam that is Perforated and Treated for Flame Retardance with a 1% Solution of 3-(hydroxyphenylphosphinyl) Propanoic Acid

In this example, a highly expanded polypropylene foam having substantially closed-cell structure was prepared using the same apparatus as in Example 1-1.

The foam is prepared at essentially the same conditions except for the following. The isobutene blowing agent was injected into the mixing zone at a rate of 12.0 kg/h (equivalent to 15 pph) and 0.05 pph talc was added for cell nucleation. In addition, the temperature of the last cooling zone was lowered to 155° C. in order to enhance the closed-cell content.

Thus—prepared polypropylene resembles in appearance the foam prepared in Example 1-1 and has a density of 17.6 kg/m$^3$ and the cell size of approximately 0.3 mm.

Determination of Open-Cell Content and Water Absorption Capability

The open-cell content and water absorption capability of the foam of this example were determined per the same methods as in Example 1-1. The open-cell content was approximately 10% and the water absorption capability was approximately 10%.

Preparation of Specimens

The highly expanded polypropylene foam prepared in this example was perforated by the same method as in Example 1-1 so that the holes can run through the foam.

Treatment for Flame Retardance

The perforated, highly expanded polypropylene foam specimens in this example were treated using 3-(hydroxyphenylphosphinyl) propanoic acid and tested for flame retardance by the same method as in Example 1-1 and subjected to flame retardance tests.

The flame retardant solution used in this example was a 1% aqueous solution of 3-(hydroxyphenylphosphinyl) propanoic acid prepared by dissolving a predetermined amount of the compound in warm water of 60° C. The employed flame retardant test was the same as in Example 1-1.

Example 2-2

Highly Expanded Closed-Cell Polypropylene Foam that is Perforated and Treated for Flame Retardance with a 3% Solution of 3-(hydroxyphenylphosphinyl) Propanoic Acid

In this example, highly expanded closed-cell polypropylene foam specimens were prepared at the same condition as in Example 2-1, treated with a 3% solution of 3-(hydroxyphenylphosphinyl) propanoic acid by the same method as in Example 1-1 and subjected to flame retardance tests.

Example 2-3

Highly Expanded Closed-Cell Polypropylene Foam that is Perforated to 5 Mm Depth and Treated for Flame Retardance with a 1% Solution of 3-(hydroxyphenylphosphinyl) Propanoic Acid

In this example, a highly expanded closed-cell polypropylene foam was prepared at the same condition as in Example 2-1, perforated to a 5 mm depth from the surface and cut to specimens.

The specimens were treated with a 1% solution of 3-(hydroxyphenylphosphinyl) propanoic acid and subjected to flame retardance tests as in Example 1-1.

Example 2-4

Highly Expanded Closed-Cell Polypropylene Foam that is Perforated to 5 Mm Depth and Treated for Flame Retardance with a 3% Solution of 3-(hydroxyphenylphosphinyl) Propanoic Acid

In this example, highly expanded closed-cell polypropylene foam specimens having 5 mm depth holes were prepared by the same method as in Example 2-3 and treated with 3% solution of 3-(hydroxyphenylphosphinyl) propanoic acid and subjected to flame retardance tests as in Example 1-1.

Comparative Example 2-1

Highly Expanded Closed-Cell Polypropylene Foam that is not Perforated but Treated for Flame Retardance with a 1% Solution of 3-(hydroxyphenylphosphinyl) Propanoic Acid

In this comparative example, a highly expanded closed-cell polypropylene foam was prepared by the same method as in Example 2-1 and cut, without perforation, to the same size specimens in Example 2-1, treated with 1% solution of 3-(hydroxyphenylphosphinyl) propanoic acid and subjected to flame retardance tests as in Example 1-1.

Comparative Example 2-2

Highly Expanded Closed-Cell Polypropylene Foam that is not Perforated but Treated for Flame Retardance with a 3% Solution of 3-(hydroxyphenylphosphinyl) Propanoic Acid

In this comparative example, a highly expanded closed-cell polypropylene foam was prepared by the same method as in Example 2-1, cut, without perforation, to specimens, treated with 3% solution of 3-(hydroxyphenylphosphinyl) propanoic acid and subjected to flame retardance tests as in Example 1-1.

Comparative Example 2-3

Highly Expanded Closed-Cell Polypropylene Foam that is Perforated but not Treated with Flame Retardant

In this comparative example, highly expanded closed-cell polypropylene foam specimens having perforations were prepared by the same method as in Example 2-1 and, without flame retardant treatment, subjected to flame retardance tests as in Example 1-1.

The results of flame retardance tests in Example 2-1 through 2-4, Comparative Examples 2-1, 2-2 and 2-3 are set forth in Table 2 below:

TABLE 2

| Test No. | Perforation Method | Concentration of Flame Retardant in Solution (%) | Content of Solid Flame Retardant (pph) | No. of Flame Retardance Tests | No. of Self-Extinguished Tests | Average Burning Time (sec) | Average Burning Rate (mm/s) |
|---|---|---|---|---|---|---|---|
| Ex. 2-1 | Perforated Through | 1 | 0.1 | 3 | 3 | 11.3 | 0.14 |
| Ex. 2-2 | Perforated Through | 3 | 2.7 | 3 | 3 | 3.2 | 0.16 |
| Ex. 2-3 | Perforated to 5 mm | 1 | 0.8 | 3 | 2 | 14.6 | 0.14 |
| Ex. 2-4 | Perforated to 5 mm | 3 | 1.2 | 3 | 3 | 1.8 | 0.12 |
| Comp. Ex. 1-1 | No perforation | 1 | 0.0 | 1 | 0 | 15.4 | 3.37 |
| Comp. Ex. 1-2 | No perforation | 3 | 3.5 | 1 | 0 | 1.8 | 8.51 |
| Comp. Ex. 1-3 | Perforated Through | Not treated | 0.0 | 1 | 0 | 13.6 | 3.85 |

As shown in Table 2, a highly expanded closed-cell polypropylene foam is also found to achieve effective flame retardance when treated with a phosphorous flame retardant.

Especially, the Example 2-1 specimen containing extremely small amount of 0.1 pph HPPA is shown to have outstanding flame retardance.

In addition, while the foam specimens having 5 mm-deep perforations exhibit a flame retardant effect as in Examples 2-3 and 2-4, the unperforated foam specimens as in Comparative Examples in 2-1 and 2-2 and the foam specimens that are not treated with flame retardant do not show the flame retardant effect Example 3-1

Highly Expanded Open-Cell Polypropylene Foam that is Perforated and Treated for Flame Retardance with a 1% Ethanol Solution of 3-(hydroxyphenylphosphinyl) Propanoic Acid In this example, highly expanded open-cell polypropylene foam specimens having perforations as in Example 1-1 were prepared and subjected to flame retardance tests.

The flame retardant used in this example was an ethanol solution of 3-(hydroxyphenylphosphinyl) propanoic acid and its concentration was 1%. The flame retardance test method was the same as in Example 1-1.

Example 3-2

Highly Expanded Open-Cell Polypropylene Foam that is Perforated and Treated for Flame Retardance with a 3% Ethanol Solution of 3-(hydroxyphenylphosphinyl) Propanoic Acid In this example, highly expanded open-cell polypropylene foam specimens having perforations were prepared as in Example 3-1, treated with a 3% ethanol solution of 3-(hydroxyphenylphosphinyl) propanoic acid and subjected to the same flame retardance tests as in Example 1-1.

Comparative Example 3

Highly Expanded Closed-Cell Polypropylene Foam that is Perforated but not Treated with Flame Retardant In this example, highly expanded open-cell polypropylene foam specimens having perforations were prepared as in Example 3-1 and, without flame retardant treatment, subjected to the same flame retardance tests as in Example 1-1.

The results of flame retardance tests in Examples 3-1, 3-2 and Comparative Example 3 are set forth in Table 3:

TABLE 3

| Test No. | Perforation Method | Concentration of Flame Retardant in Solution (%) | Content of Solid Flame Retardant (pph) | No. of Flame Retardance Tests | No. of Self-Extinguished Tests | Average Burning Time (sec) | Average Burning Rate (mm/s) |
|---|---|---|---|---|---|---|---|
| Ex. 3-1 | Perforated Through | 1 | 0.9 | 2 | 2 | 7.8 | 2.70 |
| Ex. 3-2 | Perforated Through | 3 | 8.9 | 3 | 3 | 3.2 | 2.65 |
| Comp. Ex. 3 | Perforated Through | Not treated | 0 | 1 | 0 | 14.7 | 2.61 |

As shown in Table 3, the specimens in Examples 3-1 and 3-2 exhibit outstanding flame retardance as indicated by self-extinguishment during the flame retardant tests and shorter burning times.

Example 4-1

Highly Expanded Closed-Cell Polypropylene Foam that is Perforated and Treated for Flame Retardance with a 1% Ethanol Solution of 3-hydroxyphenylphosphinyl) Propanoic Acid In this example, highly expanded closed-cell polypropylene foam specimens having perforations as in Example 3-1 were prepared and subjected to flame retardance tests.

The flame retardant solution used in this example was a 1% ethanol solution of 3-(hydroxyphenylphosphinyl) propanoic acid and the flame retardance test method was the same as in Example 1-1.

Example 4-2

Highly Expanded Closed-Cell Polypropylene Foam that is Perforated and Treated for Flame Retardance with a 3% Ethanol Solution of 3-(hydroxyphenylphosphinyl) Propanoic Acid In this example, highly expanded closed-cell polypropylene foam specimens having perforations were prepared as in Example 4-1, treated with a 3% ethanol solution of 3-(hydroxyphenylphosphinyl) propanoic acid and subjected to the same flame retardance tests as in Example 1-1.

Comparative Example 4

Highly Expanded Closed-Cell Polypropylene Foam that is Perforated but not Treated with Flame Retardant In this example, highly expanded closed-cell polypropylene foam specimens having perforations were prepared as in Example 4-1 and, without flame retardant treatment, subjected to the same flame retardance tests as in Example 1-1.

The results of flame retardance tests in Examples 4-1, 4-2 and Comparative Example 4 are set forth in Table 4:

As shown in Table 4, the specimens in Examples 4-1 and 4-2 exhibit flame retardance as indicated by self-extinguishment during the flame retardant tests and the average burning times are shorter than for Comparative Example 4.

Example 5

Polyethylene Foam Containing 5 Parts by Weight of 3-(hydroxyphenylphosphinyl) Propanoic Acid Per 100 Parts of Resin In this Example 5, a Closed-Cell Polyethylene Foam was Prepared and Subjected to Flame retardance tests.

The apparatus used to prepare the closed-cell polyethylene foam is a tandem foam extrusion line comprising a 30 mm-screw diameter twin screw extruder and a single screw cooling extruder. The primary extruder was a Leistritz model LSM34 extruder having screws of 40-diameter length. The extruder has a mixing zone after the usual feeding, melting and metering zone. A blowing agent injection port is located 19-screw diameter distance from the resin feed hopper. The primary extruder has a total of eight heating zones. The cooling extruder also has a screw of 40-diameter length and three cooling zones on its barrel. At the end of the cooling extruder, there is attached a die orifice with a rectangular opening of 3 mm in height and 6 mm in width.

In practice, the primary extruder was started with the three feeding zones maintained at 100° C., 110° C. and 150° C., respectively, and the rest of the zones at 180° C. The screw rotating speed of the extruder was gradually increased to 32 revolutions per minute (rpm). The cooling extruder was started with all three zones set at 165° C. and its screw rotating speed was adjusted to 25 rpm.

First, one hundred parts of a branched polyethylene foam having a melt index of 2.3 (determined per ASTM D-1238, Condition 2.16 kg/190° C.) and five parts of 3-(hydroxyphenylphosphinyl) propanoic acid are preblended and fed into the primary extruder at a rate of 2.6 kg per hour. Isobutane is injected in a liquid state under pressure into the mixing zone of the extruder through the blowing agent injection port at a rate to be approximately 10.5 parts per one hundred parts of the polymer resin and let mix uniformly with the polymer melt. When a steady extrusion condition was established, the temperatures of the cooling extruder zones were gradually reduced. When the temperature of the molten mixture of the polymer resin and blowing agent reached 104° C., an optimum foam having closed-cell structure was achieved. As

TABLE 4

| Test No. | Perforation Method | Concentration of Flame Retardant in Solution (%) | Content of Solid Flame Retardant (pph) | No. of Flame Retardance Tests | No. of Self-Extinguished Tests | Average Burning Time (sec) | Average Burning Rate (mm/s) |
|---|---|---|---|---|---|---|---|
| Ex. 4-1 | Perforated Through | 1 | 1.5 | 2 | 2 | 9.3 | 2.42 |
| Ex. 4-2 | Perforated Through | 3 | 4.4 | 2 | 2 | 9.1 | 2.20 |
| Comp. Ex. 4 | Perforated Through | Not treated | 0 | 1 | 0 | 13.6 | 3.85 | summarized in Table 5, the foam has small cells and oval cross-section and a density of 33 kg/m$^3$ when measured after aging for a month.

14 cm-long specimens were cut out of the foam strand and subjected to flame retardance tests as in Example 1-1.

Comparative Example 5

Polyethylene Foam Containing No Flame Retardant

A polyethylene foam containing no flame retardant was prepared by the same method as in Example 5 and subjected to flame retardance tests. As shown in Table 5, the foam was of a large cell size, relatively large cross-section and closed-cell structure. In order to prepare flame retardance test specimens having the cross-sectional size resembling those in Example 5, the foam strand was split approximately into two halves and used. Thus, the specimens for the flame retardance tests in this comparative example have a semi-elliptic cross-section of approximately 10 mm in the thickness and approximately 22 mm in the width. The flame retardance tests were conducted with the width of the specimen aligned vertically.

The results of the flame retardance tests in Example 5 and Counter Example 5 are set forth in Table 5:

TABLE 5

| Test | Foaming Temp. (° C.) | Foam Thickness (mm) | Foam Width (mm) | Cell Size (mm) | Foam Density (kg/m$^3$) | No. of Flame Retardance Tests | No. of Self-Extinguished Tests |
|---|---|---|---|---|---|---|---|
| Ex. 5 | 104 | 13 | 17 | 0.5 | 33 | 6 | 5 |
| Comp. Ex. 5 | 114 | 18 | 22 | 4.0 | 45 | 5 | 0 |

As shown in Table 5, the Example 5 foam is shown to have self-extinguished during five out of six flame retardance tests, while the Counter Example 5 foam burned out during all five tests.

Example 6

Polypropylene/Polyethylene Blend Foam Containing 3 Parts by Weight of 3-(hydroxyphenylphosphinyl) Propanoic Acid Per 100 Parts of Resin In this example, a polyolefin blend foam containing 3-(hydroxyphenylphosphinyl) propanoic acid was prepared using the same apparatus and method as in Example 5. The polyolefin blend resin that was used in this example was a blend of 60% by weight of a polypropylene resin and 40% by weight of the polyethylene resin employed in Example 5. The polypropylene resin was PRO-FAX PF-814 grade polypropylene homopolymer resin supplied by Basell Polyolefins, which has a high melt strength (HMS) and melt flow rate (MFR) of 3 as determined per ASTM D-1238 at 2.16 kg/230° C.

In practice, one-hundred parts of the granular polymer resin blend was premixed with three parts of 3-(hydroxyphenylphosphinyl) propanoic acid and fed into the extruder. Isobutane was injected into the extruder at a rate to be 8.8 parts by weight per one hundred parts of the polymer resin. When a steady extrusion condition was established, the temperatures of the cooling extruder zones were gradually reduced so that temperature of the molten mixture of the resin and blowing agent (foaming temperature) reached 104° C., a closed-cell foam having small cells and relatively small cross-section was achieved (refer to Table 6).

The foam was aged for approximately one month and cut to 140 mm-long specimens and subjected to flame retardance tests as in Example 1-1.

Comparative Example 6

Polypropylene/Polyethylene Foam Containing No Flame Retardant

A polypropylene/polyethylene blend foam containing no flame retardant was prepared from the same resin blend as in Example 6 and by the same method as in Example 6 and subjected to flame retardance tests. As shown in Table 6, when the temperature of the molten mixture of the resin/blowing agent is reduced to 144° C., a good-quality closed-cell foam having a relatively large cell size. As in Comparative Example 5, the foam strand was split approximately into two halves and used for flame retardance tests.

The results of the flame retardance tests in Example 6 and Counter Example 6 are set forth in Table 6:

TABLE 6

| Test | Foaming Temp. (° C.) | Foam Thickness (mm) | Foam Width (mm) | Cell Size (mm) | Foam Density (kg/m$^3$) | No. of Flame Retardance Tests | No. of Self-Extinguished Tests |
|---|---|---|---|---|---|---|---|
| Ex. 6 | 148 | 11 | 15 | 0.8 | 34 | 5 | 5 |
| Comp. Ex. 6 | 144 | 19 | 23 | 2.7 | 33 | 6 | 1 |

As shown in Table 6, the Example 6 foam exhibited an outstanding flame retardance by self-extinguishing during five out of five flame retardance tests, while the Counter Example 6 foam burned out during five out of six tests.

Example 7

Polypropylene Foam Containing 3 Parts by Weight of 3-(hydroxyphenylphosphinyl) Propanoic Acid Per 100 Parts of Resin In this example, a polypropylene foam containing 3 parts by weight of 3-(hydroxyphenylphosphinyl) propanoic acid per one hundred parts of resin was prepared from PRO-FAX PF-814 grade polypropylene resin as used in Example 6 using the extrusion apparatus employed in Example 5. The foaming temperature, the dimensions and properties of the foam prepared in this example is given in Table 7 below. The foam was subjected to flame retardance tests as in Example 1-1.

The results of the flame retardance tests in Example 7 are set forth in Table 7:

TABLE 7

| Test | Foaming Temp. (° C.) | Foam Thickness (mm) | Foam Width (mm) | Cell Size (mm) | Foam Density (kg/m$^3$) | No. of Flame Retardance Tests | No. of Self-Extinguished Tests |
|---|---|---|---|---|---|---|---|
| Ex. 7 | 148 | 18 | 24 | 1.5 | 40 | 5 | 5 |

As shown in Table 7, the Example 7 foam has excellent flame retardance as indicated by self-extinguishment during all five tests.

What is claimed is:

1. A highly expanded flame-retardant polymer foam of expansion ratio greater than 4.5 prepared from a polymer resin selected from the group consisting of polypropylene homopolymers, polypropylene copolymers containing greater than 50% propylene moiety, polyethylene homopolymers, polyethylene copolymers and blends there of, and an organic phosphorous flame retardant selected from the derivatives of carboxylic acid of phenylphosphinic acid as depicted by chemical formula 1 below:

Chemical Formula 1

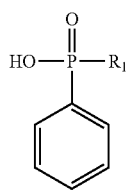

where $R_1$ is —$CH_2COOH$, $CH_2CH_2COOH$ or —COOH.

2. The highly expanded flame-retardant polymer foam in claim 1 wherein the derivative of carboxylic acid of phenylphosphinic acid is 3-(hydroxyphenylphosphinyl) propanoic acid.

3. The highly expanded flame-retardant polymer foam in claim 1 wherein the content of the organic phosphorous flame retardant is in the range from 0.1 parts per one hundred parts of polymer resin to 50 parts per hundred parts of the polymer resin.

4. The highly expanded flame-retardant polymer foam in claim 1 has an expansion ratio in the range from 10 to 225.

5. The highly expanded flame-retardant polymer foam in claim 1 wherein the polymer resin is a resin blend comprising 50% or more of propylene moiety.

6. The highly expanded flame-retardant polymer foam in claim 1 wherein the polymer resin is polypropylene homopolymer.

7. The highly expanded flame-retardant polymer foam in claim 1 wherein the polymer foam contains 5% or more open cells.

8. The highly expanded flame-retardant polymer foam in claim 1 wherein the foam polymer foam contains an antioxidant and a radiation blocking agent.

9. The highly expanded flame-retardant polymer foam in claim 8 wherein the radiation blocking agent is selected from the group consisting of carbon black and graphite powder.

10. A method of preparing a flame-retardant polymer foam in claim 1 comprising the steps of
    manufacturing a highly expanded polymer foam,
    treating the highly expanded polymer foam for flame retardance with a solution of organic phosphorous flame retardant and
    drying the treated highly expanded polymer foam.

11. The method of preparing a flame-retardant polymer foam using a phosphorous flame retardant in claim 10 wherein the step of perforating a highly expanded polymer foam is added after the step of manufacturing the highly expanded polymer foam.

12. The method of preparing a flame-retardant polymer foam using a phosphorous flame retardant in claim 11 wherein the density of perforations is in the range from 2 holes per 10 cm$^2$ to 50 holes per 10 cm$^2$ of the highly expanded polymer foam.

13. The method of preparing a flame-retardant polymer foam using a phosphorous flame retardant in claim 10 wherein the solution of organic phosphorous flame retardant is an aqueous or alcoholic solution of a derivative of carboxylic acid of phenylphosphinic acid as depicted by chemical formula 1 below:

Chemical Formula 1

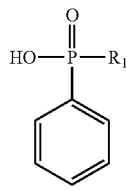

where $R_1$ is —$CH_2COOH$, $CH_2CH_2COOH$ or —COOH.

14. The method of preparing a flame-retardant polymer foam using a phosphorous flame retardant in claim 13 wherein the carboxylic acid is propanoic acid.

15. The method of preparing a flame-retardant polymer foam using a phosphorous flame retardant in claim 10 wherein the step of manufacturing a highly expanded polymer foam is the extrusion process expanding a thermoplastic resin with a volatile blowing agent using a foam extruder.

16. The method of preparing a flame-retardant polymer foam using a phosphorous flame retardant in claim 15 wherein the volatile blowing agent is one or more compounds selected from the group consisting of hydrocarbons that include ethane, propane, normal butane, isobutene and pentane, alcohols, carbon dioxide and water.

17. The method of preparing a flame-retardant polymer foam using a phosphorous flame retardant in claim 10 wherein the polymer resin is a polymer blend comprising 50% or more of propylene moiety.

18. The method of preparing a flame-retardant polymer foam using a phosphorous flame retardant in claim 10 wherein the polymer resin is a polypropylene homopolymer having a melt flow index of 3 or lower.

19. The method of preparing a flame-retardant polymer foam using a phosphorous flame retardant in claim 10 wherein treating the highly expanded polymer foam for flame retardance is done by submerging the highly expanded polymer foam in a phosphorous flame retardant solution or by spraying a phosphorous flame retardant solution.

20. A method of preparing a flame-retardant polymer foam in claim 1 by mixing a derivative of carboxylic acid of phenylphosphinic acid as depicted by chemical formula 1 below in a molten polymer-resin and volatile blowing agent and foaming the mixture by the extrusion process:

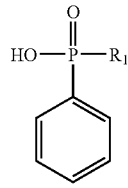

Chemical Formula 1 where $R_1$ is —$CH_2COOH$, $CH_2CH_2COOH$ or —COOH.

21. The method of preparing a flame-retardant polymer foam using a phosphorous flame retardant in claim 20 wherein the phosphorous flame retardant is 3-(hydroxyphenylphosphinyl) propanoic acid which is mixed in an amount in the range from 0.1 part per one hundred parts of resin to 10 parts per one hundred parts of resin.

* * * * *